(12) United States Patent
Chen et al.

(10) Patent No.: US 11,486,695 B2
(45) Date of Patent: Nov. 1, 2022

(54) MEASUREMENT DEVICE FOR GRINDING WHEEL

(71) Applicant: METAL INDUSTRIES RESEARCH & DEVELOPMENT CENTRE, Kaohsiung (TW)

(72) Inventors: Chin-Kang Chen, Kaohsiung (TW); Ching-An Lin, Kaohsiung (TW); Chia-Ho Cheng, Kaohsiung (TW); Sung-Liang Hsieh, Kaohsiung (TW); Chih-Hsin Chang, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 194 days.

(21) Appl. No.: 17/111,918

(22) Filed: Dec. 4, 2020

(65) Prior Publication Data
US 2021/0254965 A1   Aug. 19, 2021

(30) Foreign Application Priority Data
Feb. 18, 2020 (TW) .................. 109201770

(51) Int. Cl.
| | | |
|---|---|---|
| *G01B 11/24* | (2006.01) | |
| *G01B 11/06* | (2006.01) | |
| *G01B 11/10* | (2006.01) | |
| *B24B 49/00* | (2012.01) | |
| *B24B 49/12* | (2006.01) | |
| *G01H 17/00* | (2006.01) | |

(52) U.S. Cl.
CPC ........ *G01B 11/0608* (2013.01); *B24B 49/003* (2013.01); *B24B 49/12* (2013.01); *G01B 11/105* (2013.01); *G01B 11/2408* (2013.01); *G01H 17/00* (2013.01)

(58) Field of Classification Search
CPC .............. G01B 11/0608; G01B 11/105; G01B 11/2408; G01B 11/306; G01B 5/061; B24B 49/003; B24B 49/12; B24B 49/02; G01H 17/00
USPC ......................................................... 356/601
See application file for complete search history.

(56) References Cited

U.S. PATENT DOCUMENTS

| | | | | |
|---|---|---|---|---|
| 4,760,668 A | * | 8/1988 | Schlaefli ................. | B24B 53/02 451/72 |
| 4,845,895 A | * | 7/1989 | Kihara ..................... | B24B 5/40 451/182 |

(Continued)

*Primary Examiner* — Isiaka O Akanbi
(74) *Attorney, Agent, or Firm* — Rosenberg, Klein & Lee

(57) ABSTRACT

The present invention provides a measurement device for grinding wheel. One or more thickness measurement device is disposed slidably on a platform. A spinning device is disposed on the platform. A grinding wheel is fixed on the spinning device. The spinning shaft spins the grinding wheel. The one or more thickness measurement device measures the flatness condition of the grinding wheel. Furthermore, according to the present invention, a diameter measurement device is disposed inside the platform and measures the roundness of the outer periphery of the grinding wheel. Since the structure can be disassembled easily, the whole measurement device for grinding wheel can be carried conveniently. In addition, measurements can be performed by users on the site where the grinding wheel is located for real-timely understanding the real size and wear condition of grinding wheel.

9 Claims, 12 Drawing Sheets

(56) References Cited

U.S. PATENT DOCUMENTS

| | | | | |
|---|---|---|---|---|
| 5,782,674 | A * | 7/1998 | Hahn | B24B 49/00 |
| | | | | 451/143 |
| 5,785,578 | A * | 7/1998 | Thoresen | B24B 51/00 |
| | | | | 451/158 |
| 6,173,213 | B1 * | 1/2001 | Amiguet | G06K 9/00 |
| | | | | 700/229 |
| 6,220,927 | B1 * | 4/2001 | Mizuno | B24B 9/14 |
| | | | | 451/10 |
| 6,290,569 | B1 * | 9/2001 | Mizuno | B24B 17/10 |
| | | | | 451/5 |
| 2001/0000502 | A1 * | 4/2001 | Stocker | H01L 21/02013 |
| | | | | 257/E21.237 |

\* cited by examiner

MEASUREMENT DEVICE FOR GRINDING WHEEL

FIELD OF THE INVENTION

The present invention relates generally to a measurement device for grinding wheel, and particularly to a measurement device capable of measuring the real size and wear status of a grinding wheel in factory.

BACKGROUND OF THE INVENTION

A grinding wheel is a consumable formed by grinding compounds and used in various grinding ab cutting processes. Generally, it is a round solid formed by bonding rough grains of grinding compounds. According to the applications, various materials and cross sections can adopted. In addition, the surface grains for a grinding wheel can also be synthesized by grinding materials with solid steel or aluminum discs.

A grinder is a grinding and cutting machine that drives a grinding wheel using an electrical machine and can be installed on a bench (bench grinder) or fixed to the ground (pedestal grinder). These types of grinders are usually used for manually sharpening knives and coarsely grinding workpieces. Coarse and fine grinding wheels are adopted for grinding cutting tools such as lathe tools, a milling cutter, or a drill bit. On the other hand, grinders with wire brush wheels or polishing wheels are used for cleaning or polishing workpieces. In particular, abrasive cutting machines are most popular and usually used in cutting objects such as the projective materials after pouring.

The casting technology according to the prior art adopts pouring to a shell mold for forming a cast blank. After removing the shell mold, the cast blank will appear multiple projective structures on the surface of top housing. The multiple projective structures are the pouring channel and the associated structures. A cone-shaped pouring cup will be remained at one end of the pouring channel. Thereby, after the removal of the shell mold, the cast blank should be cut from the pouring channel. The cutting method according to the prior art is to cut with the hand holding the cast blank. The operator holds the cast blank and pushes it to the grinding wheel spinning at high speed for cutting the top housing of individual cast blank. The remaining pouring channel and pouring cup will be recycled. Nonetheless, the cutting method by holding cast blanks according to the prior art induces safety concerns. Besides, powders and iron dusts will permeate among the air. Accordingly, semi- or fully-automatic cutting machines are developed, in which cast blanks are clipped by a clip fixture. Then the cast blanks are pushed to the grinding wheel by the clip fixture for cutting the top housing from the cast blanks.

Nonetheless, the grains on the griding wheel of the bench grinder or pedestal grinder according to the prior art should be distributed uniformly for cutting cast blanks. In addition, the thickness and diameter of each sector on the grinding wheel must be tightly controlled to meet the requirement of precision casting. The control of the thickness and diameter of grinding wheels is achieved by trimming of a trimmer for grinding wheels to average thickness. Thereby, the measurement of grinding wheel appears important. Moreover, it is inconvenient to carry current clip fixtures for measurement device, making on-site and real-time measurement for understanding the real size and consumption of grinding wheels not possible. Consequently, the industry needs urgently a simpler structural design of the measurement device for griding wheel to understand the real size and wear condition of grinding wheel on the factory site.

Given the problems faced by the prior art, the present invention provides a measurement device for grinding wheel. A thickness measurement device is disposed on a platform, which is disposed on a spinning device. The grinding wheel is fixed to the spinning device. The spinning device spins the grinding wheel. The thickness measurement device measures the flatness condition of the side surface of the grinding wheel. Since the structure of the thickness measurement device can be disassembled easily, the whole measurement device for grinding wheel can be carried conveniently. In addition, measurements can be performed by users on the site where the grinding wheel is located for real-timely understanding the real size and wear condition of grinding wheel.

SUMMARY

An objective of the present invention is to provide a measurement device for grinding wheel. A grinding wheel is fixed on a spinning device of a platform. One or more thickness measurement device and one or more diameter measurement device are disposed on the platform. The spinning device spins the grinding wheel. The thickness measurement device measures the flatness condition of the side of the grinding wheel. The one or more diameter measurement device measures the variation in the diameter of the side of the grinding wheel. In addition, the measurement device for grinding wheel include a structure for easy disassembling so that it can be carried conveniently.

To achieve the above objective and efficacy, the present invention provides a measurement device for grinding wheel, which comprises a platform, one or more thickness measurement device, a spinning device, and one or more diameter measurement device. The one or more thickness measurement device is disposed on the platform, and includes one or more sliding rail, a sliding block, a frame, and a measurement component. The one or more sliding rail is disposed on the platform. The sliding block is disposed slidably on the one or more sliding rail. One end of the frame is disposed on the sliding block. One end of the measurement component is disposed on the other end of the frame. The spinning device is adjacent to one end of the one or more sliding rail and includes a spinning shaft and a spinning base. The spinning base is disposed on the platform. The spinning shaft spins with respect to the spinning base. The one or more diameter measurement device is disposed inside the platform. The one or more thickness measurement device is disposed inside the platform. The one or more diameter measurement device includes one or more hole, a diameter measurement member, a sliding member, and a contact member. One end of the one or more hole is adjacent to one side of the spinning device. The diameter measurement member is disposed on an inner side of platform. The sliding member is inserted to and disposed slidably on one side of the diameter measurement member. The contact member passes through the one or more hole. One end of the contact member is connected with one end of the sliding member. By using the structure, a user can measure the grinding wheel on the factory site for understanding real-timely the real size and the wear condition of the grinding wheel.

According to an embodiment of the present invention, the measurement device for grinding wheel further comprises a top housing and a bottom housing. The bottom housing is disposed below the top housing. An accommodating space is disposed between the top housing and the bottom housing. The one or more sliding rail and the one or more hole are disposed on the top housing. The spinning base is pivoted on the top housing. The one or more diameter measurement device is disposed in the accommodating space.

According to an embodiment of the present invention, the spinning device further includes a bearing embedded to the platform. The spinning shaft passes through an inner side of the bearing.

According to an embodiment of the present invention, the spinning device further includes a sleeve put around the spinning shaft and contacting the spinning base.

According to an embodiment of the present invention, the measurement component includes a case, a light-emitting device, a sensing device, and a probe. The case is disposed on the other end of the frame. The light-emitting device is disposed on an inner side of the case. The sensing device is disposed in the case corresponding to the light-emitting device. The probe is inserted to one end of the case. One end of the probe includes a scale located between the light-emitting device and the sensing device.

According to an embodiment of the present invention, a width of the one or more hole is greater than a length of the sliding member.

According to an embodiment of the present invention, the measurement device for grinding wheel further comprises a vibration measurement device connected to the bottom end of the spinning shaft. The vibration measurement device includes a vibration measurement member and a spinning-shaft contact member. The vibration measurement member is disposed inside the platform. The spinning-shaft contact member is disposed inside the vibration measurement member. The spinning-shaft contact member contacts the bottom end of the spinning shaft.

According to an embodiment of the present invention, the measurement device for grinding wheel further comprises a motor disposed on the inner side of the platform and connected to the bottom end of the spinning shaft for driving the spinning shaft to spin.

According to an embodiment of the present invention, the spinning shaft passes through the spinning base and is pivoted to the platform.

DETAILED DESCRIPTION

In order to make the structure and characteristics as well as the effectiveness of the present invention to be further understood and recognized, the detailed description of the present invention is provided as follows along with embodiments and accompanying figures.

The present invention provides a measurement device for grinding wheel. One or more thickness measurement device is disposed slidably on a platform. A spinning device is disposed on the platform. A grinding wheel is fixed on the spinning device. The spinning shaft spins the grinding wheel. The one or more thickness measurement device measures the flatness condition of the grinding wheel. Furthermore, according to the present invention, a diameter measurement device is disposed inside the platform and measures the roundness of the outer periphery of the grinding wheel.

Figure 1:
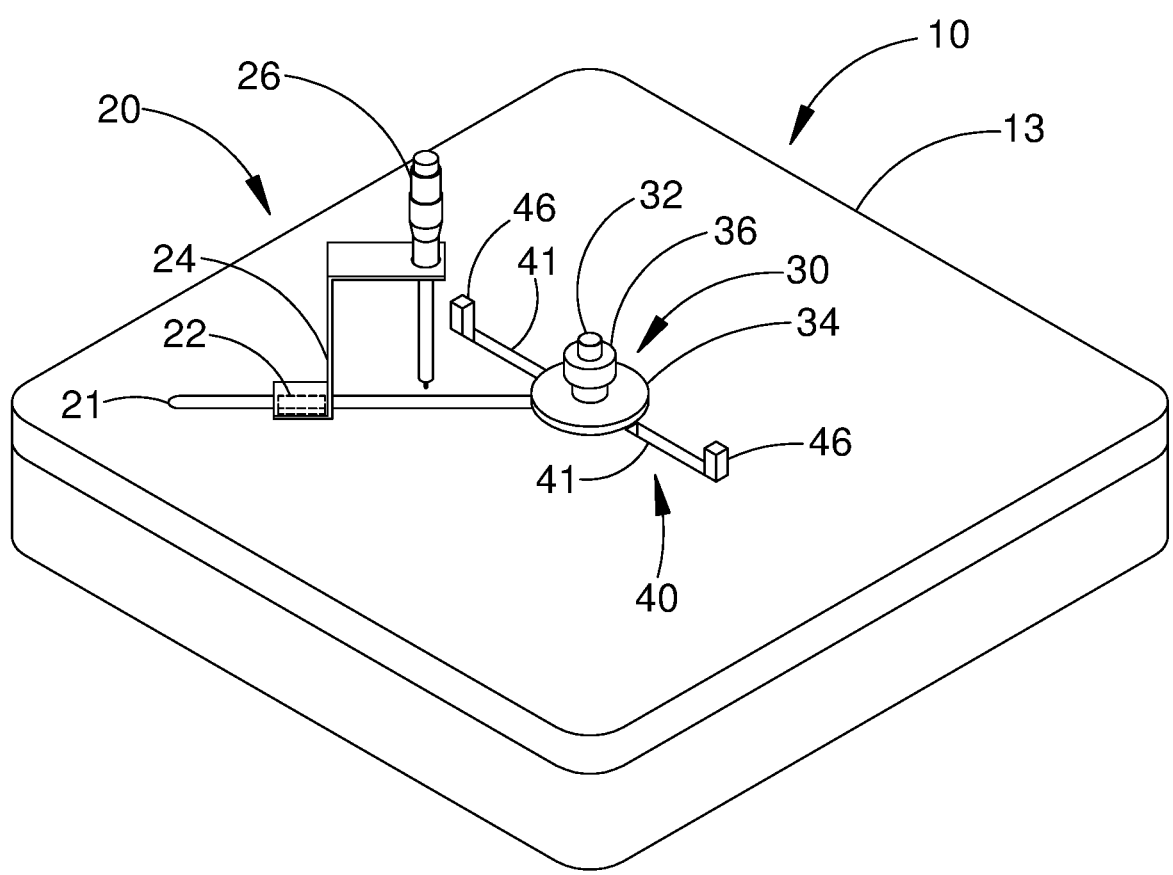
FIG. 1 shows a schematic diagram of the structure according to an embodiment of the present invention.

Please refer to FIG. 1, which shows a schematic diagram of the structure according to an embodiment of the present invention. As shown in the figure, the measurement device for grinding wheel 1 comprises a plat 10, one or more thickness measurement device 20, a spinning device 30, and one or more diameter measurement device 40.

Figure 2:
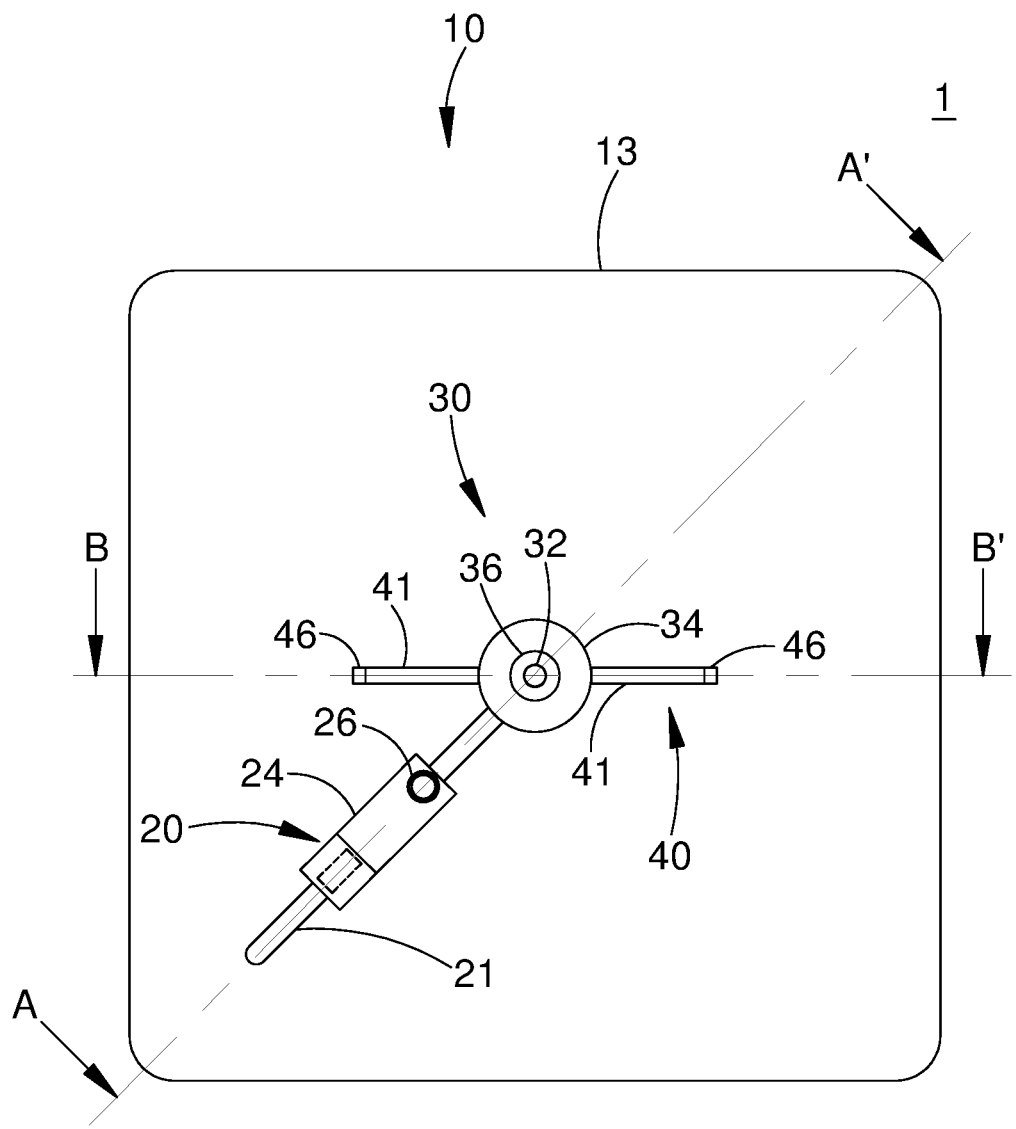
FIG. 2 shows a top view of the structure according to an embodiment of the present invention.

Please refer to FIG. 1 again and to FIG. 2, which shows a top view of the structure according to an embodiment of the present invention. As shown in the figures, according to the present embodiment, the one or more thickness measurement device 20 is disposed on the platform 10 and includes one or more sliding rail 21, a sliding block 22, a frame 24*m* and a measurement component 26. The one or more sliding rail 21 is disposed on the platform 10. The sliding block 22 is disposed slidably on the one or more sliding rail 21. One end of the frame 24 is disposed on the sliding block 22. One end of the measurement component 26 is disposed on the other end of the frame 24 for measuring the thickness of objects. The spinning device 30 is adjacent to one end of the one or more sliding rail 21, and includes a spinning shaft 32 and a spinning base 34. One end of the spinning shaft 32 passes through the spinning base 34 and is pivoted on the platform 10. The spinning shaft 32 can spin pivotally with respect to the spinning base 34. The one or more diameter measurement device 40 is disposed on an inner side of the platform 10 for measuring the diameter of objects.

According to the present embodiment, the platform 10 include a top housing 13 and a bottom housing 14. The top housing 13 is disposed on the bottom housing 14. An accommodating space 15 is disposed between the top housing 13 and the bottom housing 14 and accommodates the one or more diameter measurement device 40. The one or more sliding rail 21, the spinning device 30, and the one or more thickness measurement device are disposed on the top housing 13. The top housing 13 and the bottom housing can be separated for replacing the objects or placing new objects, such as the disassembled one or more thickness measurement device 20 or other tools and components, in the accommodating space 15.

Figure 3:
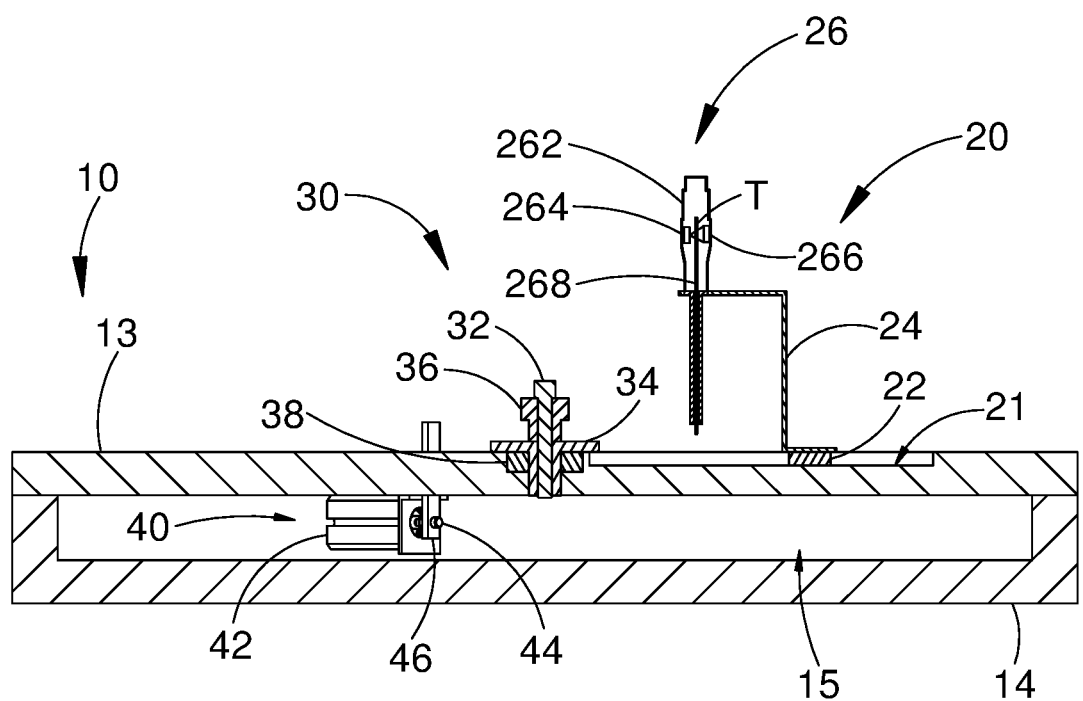
FIG. 3 shows a first cross-sectional view of the structure according to an embodiment of the present invention.

Please refer to FIG. 3, which shows a first cross-sectional view of the structure according to an embodiment of the present invention. FIG. 3 is a cross-sectional view along A-A' in FIG. 2. As shown in the figure, according to the present embodiment, the spinning device 20 further includes a bearing 38 embedded to the inner side of the platform 10, namely, to the inner side of the top housing 13. The spinning shaft 32 passes through an inner side of the bearing 38 and spins in the inner side of the bearing 38. The spinning device 30 further includes a sleeve 36 put around the spinning shaft 32 and contacting the top of the spinning base 34.

Figure 4:
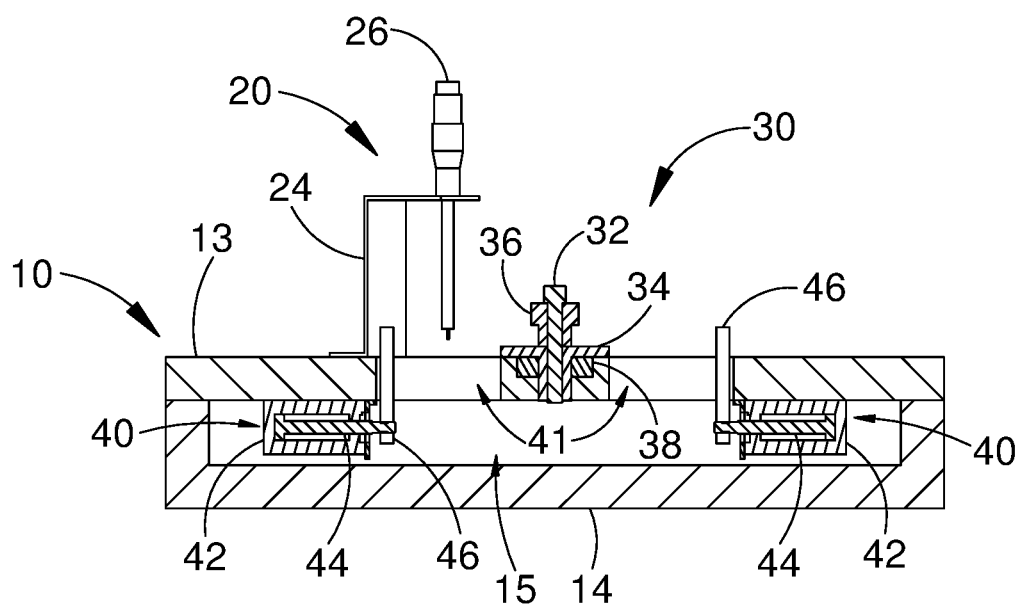
FIG. 4 shows a second cross-sectional view of the structure according to an embodiment of the present invention.

Please refer to FIG. 1 and FIG. 2 again and to FIG. 4, which shows a second cross-sectional view of the structure according to an embodiment of the present invention. FIG. 4 is a cross-sectional view along B-B' in FIG. 2. As shown in the figures, according to the present embodiment, the one or more diameter measurement device 40 includes one or more hole 41, a diameter measurement member 42, a sliding member 44, and a contact member 46. According to the present embodiment, two diameter measurement device 40 are used. According to the present embodiment, the one or more diameter measurement device 40 is disposed in the accommodating space 15 between the top housing 13 and the bottom housing 14 and located on one side below the one or more thickness measurement device 40. One end of the one or more hole 41 is adjacent to one side of the spinning device 30, namely, one side below the spinning base 34. The diameter measurement member 42 is disposed on an inner side of the platform 10, namely, inside the accommodating space 15. The sliding member 44 is inserted to and disposed slidably on an inner side of the diameter measurement member 42. The contact member 46 passes through the one or more hole 41. One end of the contact member 46 is connected with one end of the sliding member 44.

Figure 5:
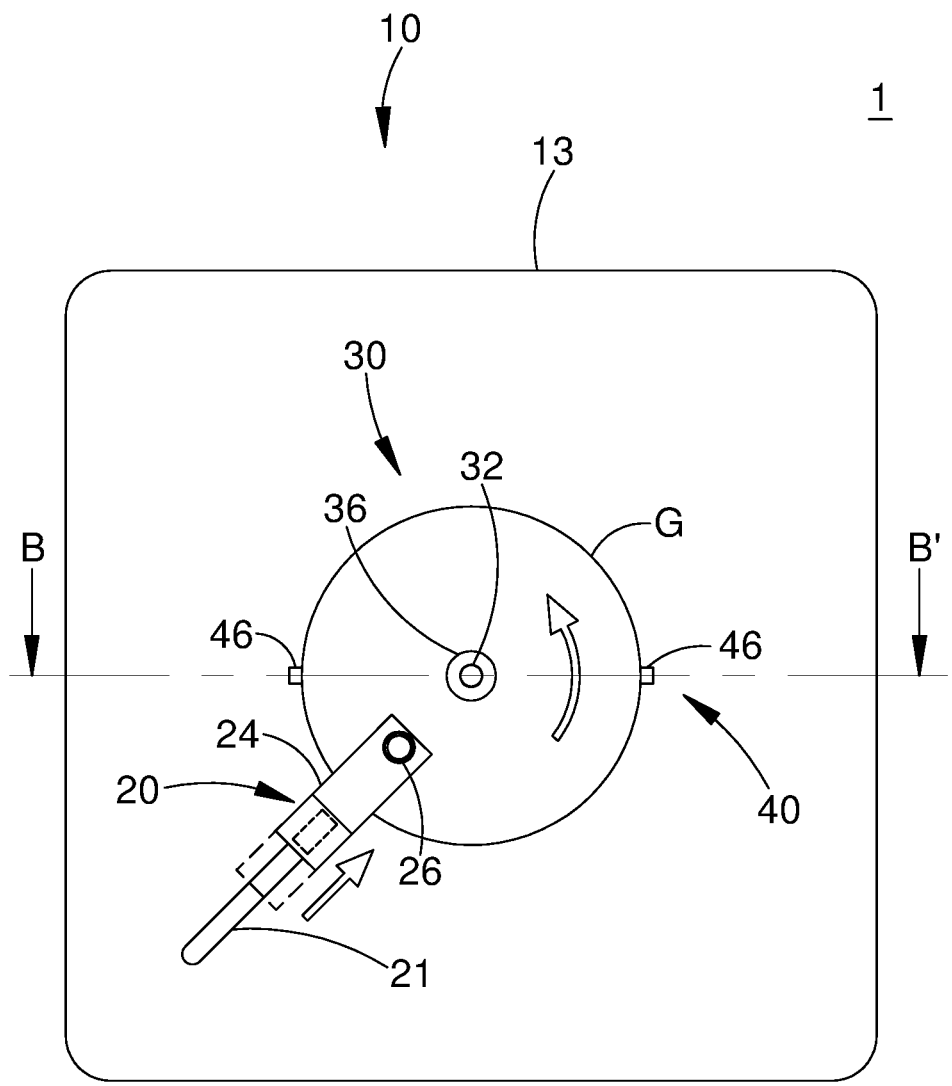
FIG. 5 shows a schematic diagram of the installation and operation of the grinding wheel according to an embodiment of the present invention.
Figure 6:
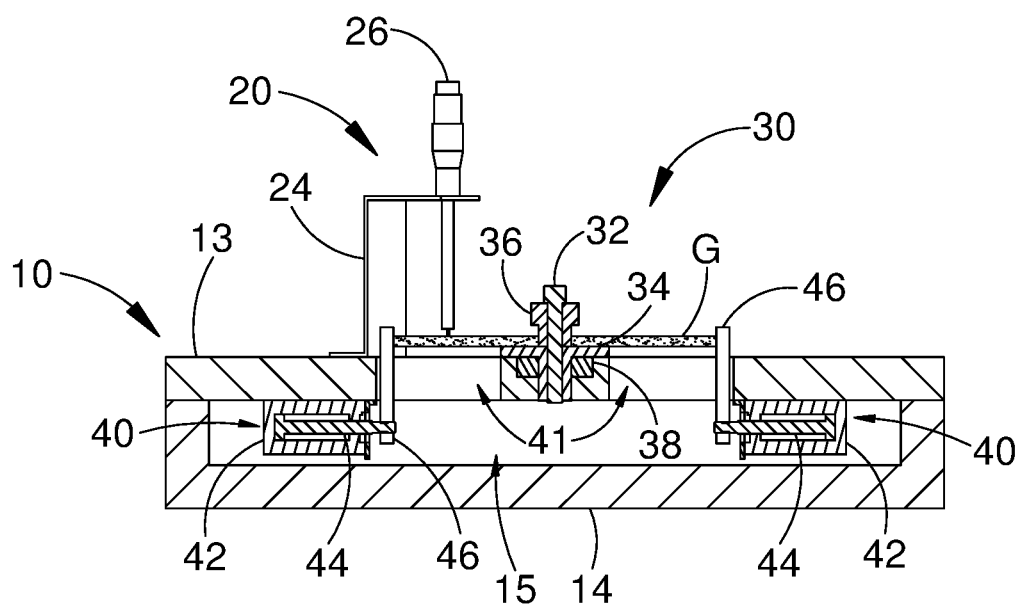
FIG. 6 shows a cross-sectional view of the grinding wheel according to an embodiment of the present invention.

Please refer FIG. 5 and FIG. 6. FIG. 5 shows a schematic diagram of the installation and operation of the grinding wheel according to an embodiment of the present invention. FIG. 6 shows a cross-sectional view of the grinding wheel according to an embodiment of the present invention. As shown in the figures, according to the present embodiment, a grinding wheel G is disposed on the spinning base 34 of the spinning device 30. The grinding wheel G is put around the spinning shaft 32. Furthermore, the sleeve 36 is put against the top of the grinding wheel G. The sleeve 36 and the spinning base 34 clip the grinding wheel G and drive the grinding wheel 32 to spin by using the spinning shaft 32. According to the present embodiment, the one or more thickness measurement device 30 slides on the one or more sliding rail 21 by means of the sliding block 22 for driving the frame to move as well as driving the measurement component 26 to move on the grinding wheel G concurrently for measuring the thickness of the grinding wheel G and calculating the wear condition.

Figure 7A:
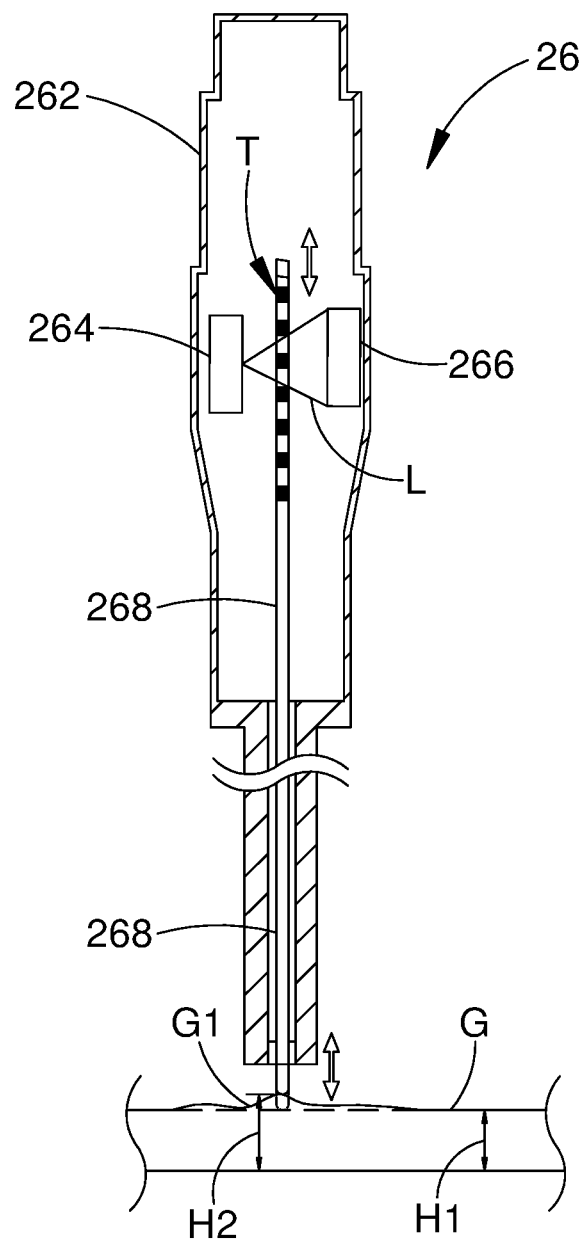
FIG. 7A shows a schematic diagram of the operation of the thickness measurement device according to an embodiment of the present invention.

Please refer FIG. 3 and FIG. 7A, which shows a schematic diagram of the operation of the thickness measurement device according to an embodiment of the present invention. As shown in the figures, according to the present embodiment, the grinding wheel G is fixed on the spinning base 34 by the downward push of the sleeve 38. The measurement component 26 includes a case 262, a light-emitting device 264, a sensing device 266, and a probe 268. The case 262 is disposed on the other end of the frame 24 for preventing the vibration of the measurement component 26 from influencing the measurement values. The light-emitting device 264 is disposed on an inner side of the case 262. The sensing device 266 is disposed on an inner side of the case 262 corresponding to the light-emitting device 264. The probe 268 is inserted to one end of the case 262. One end of the probe 268 includes a scale T located between the light-emitting device 264 and the sensing device 266. According to the present embodiment, a first bump G1 is generated on the grinding wheel G after usage. There is a preset standard thickness, namely, a first height H1, for the grinding wheel G. The generate first bump G1 has an abnormal thickness, namely, a second height H2. To inspect if the grinding wheel G complies with the preset standard thickness, the probe 268 of the measurement component 26 contacts the grinding wheel G. Then the spinning device 30 spins the grinding wheel (for example, the user manually rotates the spinning device 30 or the grinding wheel G). When the probe 268 passes by the first bump G1, the probe 268 moves upward or downward and drives the scale T to move upward or downward. The light-emitting device 264 emits a ray to the scale T. The ray is reflected to the sensing device 266. The sensing device 266 reads the upward or downward movement of the scale T for acquiring the movement value of the probe 268. Then the variation in the thickness of the grinding wheel G can be measured.

Figure 7B:
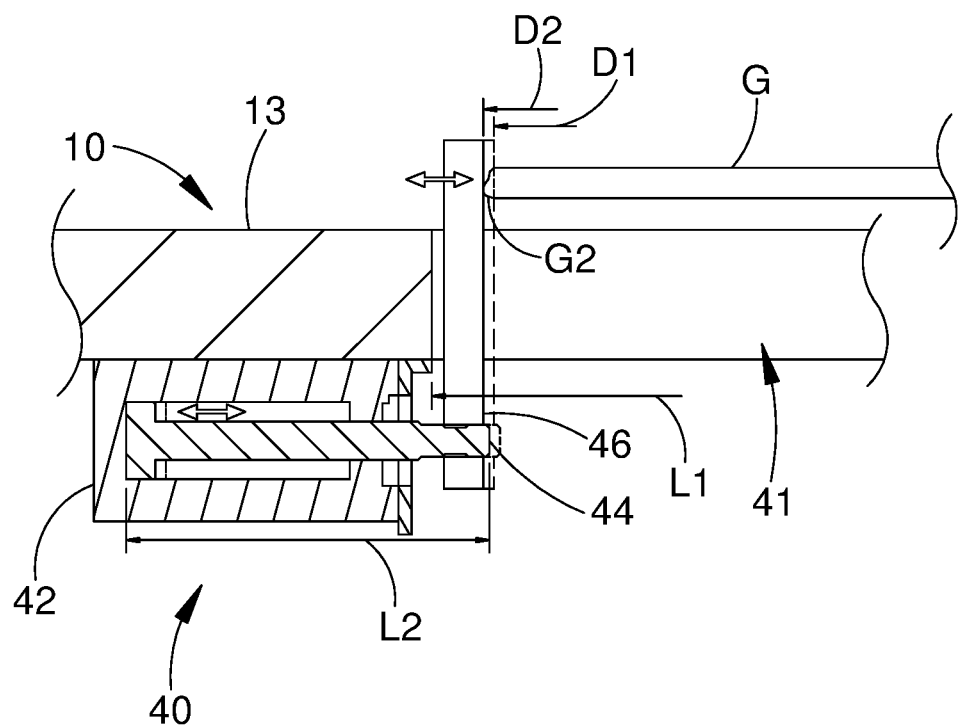
FIG. 7B shows a schematic diagram of the operation of the diameter measurement device according to an embodiment of the present invention.

Please refer FIG. 4 and FIG. 7B, which shows a schematic diagram of the operation of the diameter measurement device according to an embodiment of the present invention. As shown in the figures, according to the present embodiment, the grinding wheel G is fixed on the spinning base 34 by the downward push of the sleeve 38. The diameter measurement member 42 of the one or more thickness measurement device 40 pushes the sliding member 44, which, in turn, pushes the contact member 46 such that the contact member 46 slides on the inner side of the one or more hole 41 and contacts one side of the grinding wheel G. Owing to usage, a second bump G2 is generated on the inner side of the grinding wheel G. The grinding wheel owns a preset standard diameter, namely, a first diameter D1. The generated first bump G1 has an abnormal diameter, namely, a second diameter D2. The contact member 46 contacts the grinding wheel G. The spinning device 30 spins the grinding wheel G. When the contact member 46 passes by the second bump G2, the contact member 46 moves leftward or rightward to drive the sliding member 44 to move. Meanwhile, the sliding member 44 moves inside the diameter measurement member 42. The diameter measurement member 42 read the leftward or rightward movement to give the movement values of the contact member 46 and the sliding member 44 for measuring the variation in the diameter of the grinding wheel G. The one or more hole 41 has a width L1; the sliding member 44 has a length L2. The width L1 of the one or more hole 41 is greater than the length L2 of the sliding member 44.

According to the present embodiment, the spinning device 30 is disposed on the platform 10. The grinding wheel G is fixed on the spinning device 30. The one or more thickness measurement device 20 is disposed slidably on the platform 10. The spinning base 34 of the spinning device 30 spins the grinding wheel G. The one or more thickness measurement device 20 is then used to measure the top of the grinding wheel G. By measuring the variation in height, the flatness condition can be calculated. According to the present embodiment, the one or more diameter measurement device 40 is further disposed on the platform 10. By using the movement of the contact member 46 of the one or more diameter measurement device 40, the diameter of the periphery of the grinding wheel G can be measured. According to the variation in diameter, the roundness can be calculated.

Figure 8:
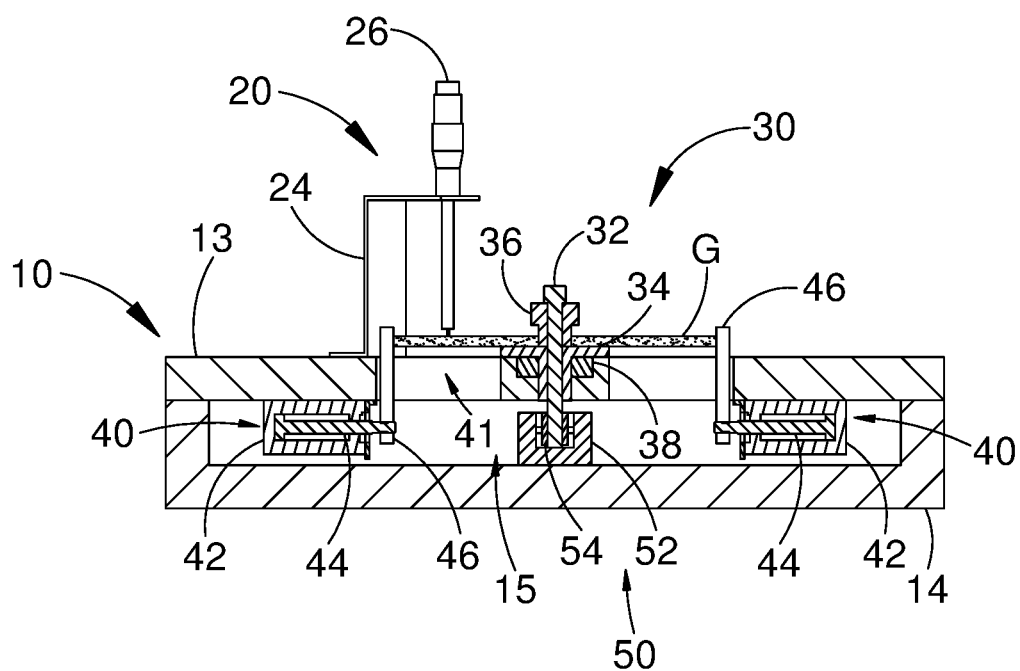
FIG. 8 shows a schematic diagram of the structure of the vibration measurement device according to an embodiment of the present invention.

Please refer to FIG. 8, which shows a schematic diagram of the structure of the vibration measurement device according to an embodiment of the present invention. As shown in the figure, the present embodiment is based in the above embodiment and further comprises a vibration measurement device 50 disposed on an inner side of the platform 10. According to the present embodiment, the vibration measurement device 50 is disposed in the accommodating space 15. The vibration measurement device 50 is connected to the bottom end of the spinning shaft 32. The vibration measurement device 50 includes a vibration measurement member 52 and a spinning-shaft contact member 54. The vibration measurement member 52 is disposed on an inner side of the platform 10. The spinning-shaft contact member 54 is disposed on an inner side of the vibration measurement member 53. The spinning-shaft contact member 52 contacts both sides of the bottom end of the spinning shaft 32.

Figure 9:
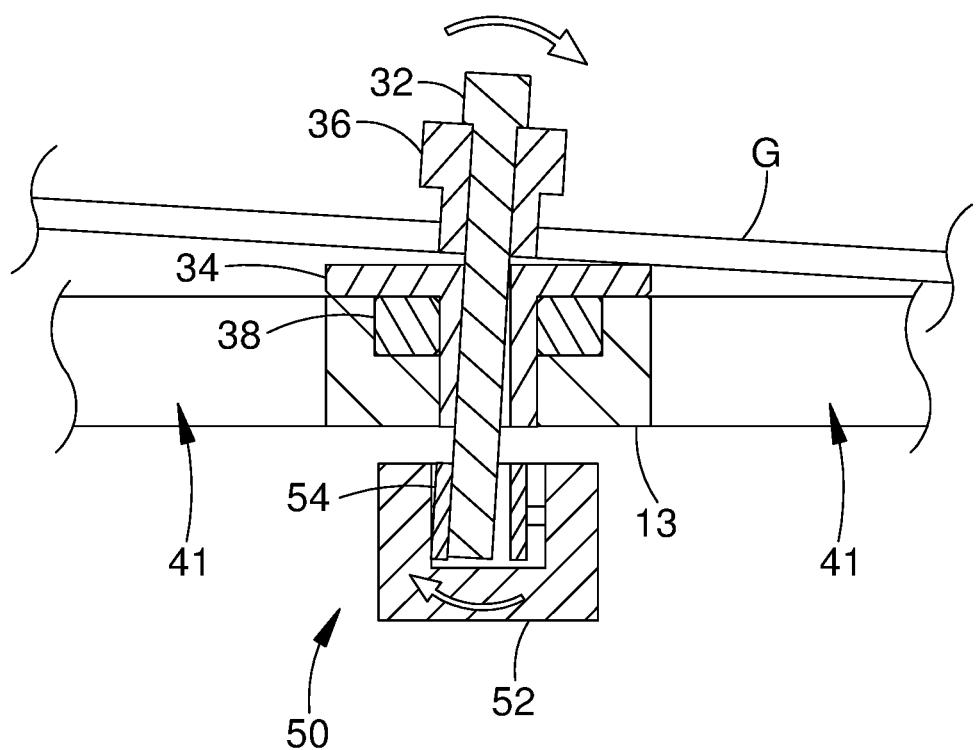
FIG. 9 shows a schematic diagram of the operation of the vibration measurement device according to an embodiment of the present invention.

Please refer to FIG. 8 again and to FIG. 9, which shows a schematic diagram of the operation of the vibration measurement device according to an embodiment of the present invention. As shown in the figures, when the grinding wheel G encounters excessive and uneven wear, vibration will occur when the grinding wheel G spins. When this happens, the spinning shaft 32 will vibrate as well. Then spinning shaft 32 will push the spinning-shaft contact member 54 to move. The vibration measurement member 52 reads the leftward or rightward movement of the spinning-shaft contact member 54 to acquire the movement value of the spinning-shaft contact member 54 and measure the wear condition of the grinding wheel G. Then the user can judge if the safety standard is met.

Figure 10:
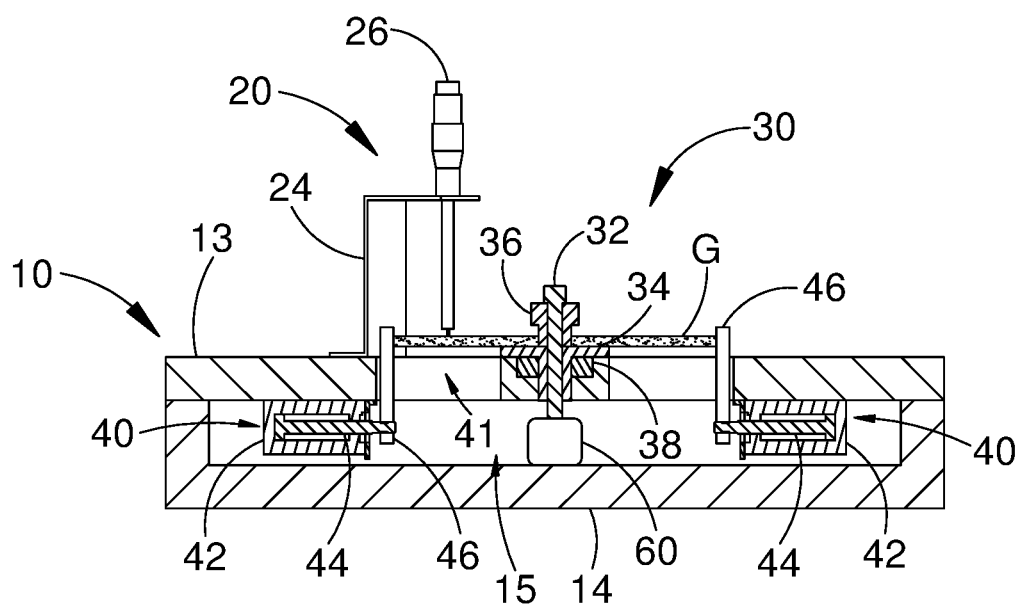
FIG. 10 shows a schematic diagram of the installation of the motor according to an embodiment of the present invention.
Figure 11:
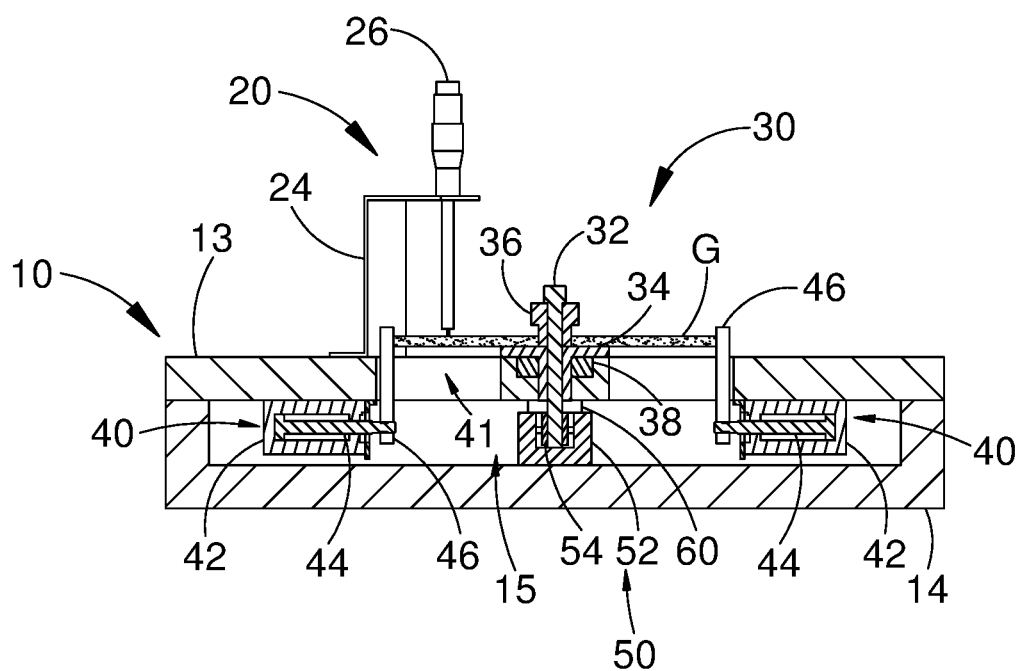
FIG. 11 shows a schematic diagram of the installation of the motor and the measurement device according to an embodiment of the present invention.

Please refer to FIG. 10 and FIG. 11. FIG. 10 shows a schematic diagram of the installation of the motor according to an embodiment of the present invention. FIG. 11 shows a schematic diagram of the installation of the motor and the measurement device according to an embodiment of the present invention. As shown in the figures, the present embodiment is based on the above embodiment and further comprises a motor 60 disposed on an inner side of the platform 10. According to the present embodiment, the motor 60 is disposed in the accommodating space 15 between the top housing 13 and the bottom housing 14. The motor 60 is connected to the bottom end of the spinning shaft 32 of the spinning device 20. The motor 60 drives the spinning shaft 32 to spin in the bearing 38 for driving the grinding wheel G to spin. As shown in FIG. 11, the motor 60 can be further disposed on the vibration measurement device 50. When the motor 60 drives the spinning shaft 32, the spinning base 34 and the grinding wheel G to spin, the vibration of the grinding wheel G is measured.

To sum up, the present invention provides a measurement device for grinding wheel. A thickness measurement device is disposed on a platform, which is disposed on a spinning device. The grinding wheel is fixed to the spinning device. The spinning device spins the grinding wheel. The thickness measurement device measures the flatness condition of the side surface of the grinding wheel. Since the structure of the thickness measurement device can be disassembled easily, the whole measurement device for grinding wheel can be carried conveniently. In addition, measurements can be performed by users on the site where the grinding wheel is located for real-timely understanding the real size and wear condition of grinding wheel.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A measurement device for grinding wheel, comprising:
    a platform;
    one or more thickness measurement device, disposed on said platform, including one or more sliding rail, a sliding block, a frame, and a measurement component, said one or more sliding rail disposed on said platform, said sliding block disposed slidably on said one or more sliding rail, one end of said frame disposed on said sliding block, and one end of said measurement component disposed on the other end of said frame;
    a spinning device, adjacent to one end of said one or more sliding rail, including a spinning shaft and a spinning base, said spinning base disposed on said platform, and said spinning shaft spinning with respect to said spinning base; and
    one or more diameter measurement device, disposed on an inner side of said platform, including one or more hole, a diameter measurement member, a sliding member, and a contact member, one end of said one or more hole adjacent to one side of said spinning device, said sliding member inserted to and disposed slidably on one side of said diameter measurement member, said contact member passing through said one or more hole, and one end of said contact member connected with one end of said sliding member.

2. The measurement device for grinding wheel of claim 1, and further comprising a top housing and a bottom housing, said bottom housing disposed below said top housing, an accommodating space disposed between said top housing and said bottom housing, said one or more sliding rail and said one or more hole disposed on said top housing, said spinning base pivoted on said top housing, and said one or more diameter measurement device disposed in said accommodating space.

3. The measurement device for grinding wheel of claim 1, wherein said spinning device further includes a bearing embedded in said platform, and said spinning shaft passing through an inner side of said bearing.

4. The measurement device for grinding wheel of claim 1, wherein said spinning device further includes a sleeve put around said spinning shaft and contacting said spinning base.

5. The measurement device for grinding wheel of claim 1, wherein said measurement component includes a case, a light-emitting device, a sensing device, and a probe; said case are disposed on the other end of said frame; said light-emitting device is disposed in said case; said sensing device is disposed in said case corresponding to said light-emitting device; said probe is inserted to one end of said case; one end of said probe includes a scale; and said scale is located between said light-emitting device and said sensing device.

6. The measurement device for grinding wheel of claim 1, wherein a width of said one or more hole is greater than a length of said sliding member.

7. The measurement device for grinding wheel of claim 1, and further comprising a vibration measurement device, connected to the bottom end of said spinning shaft, including a vibration measurement member and a spinning-shaft contact member, said vibration measurement member disposed in said platform, said spinning-shaft contact member disposed in said vibration measurement member, and said spinning shaft contact member contacting the bottom end of said spinning shaft.

8. The measurement device for grinding wheel of claim 1, and further comprising a motor, disposed in said platform, connected to the bottom end of said spinning shaft for driving said spinning shaft to spin.

9. The measurement device for grinding wheel of claim 1, wherein said spinning shaft passes through said spinning base and is pivoted to said platform.

\* \* \* \* \*